(No Model.)
S. B. ALLEY.
CHECK ROW PLANTER.
No. 396,797. Patented Jan. 29, 1889.
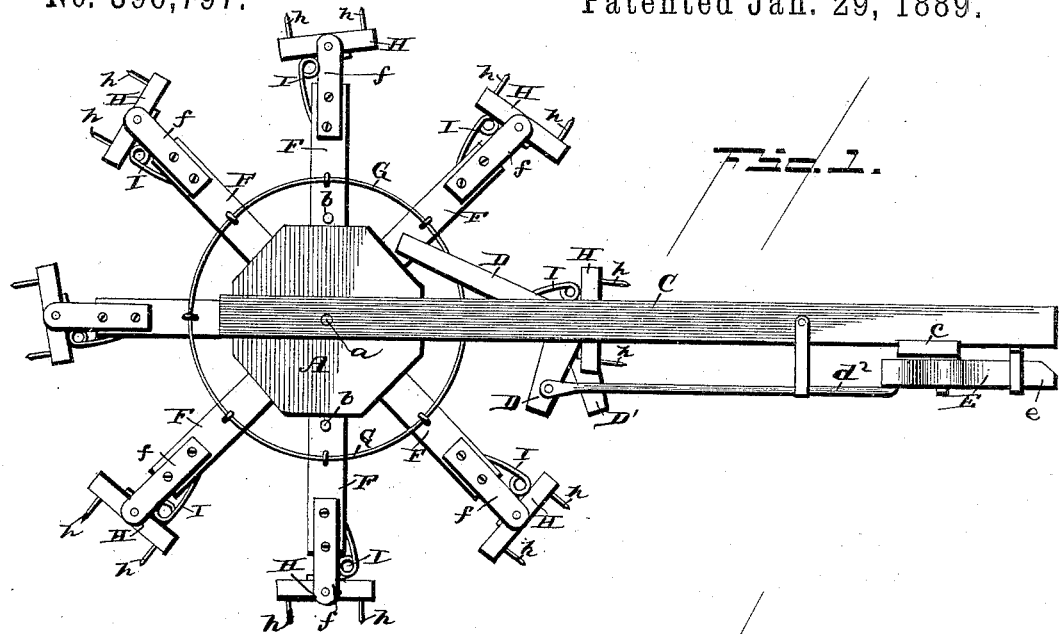
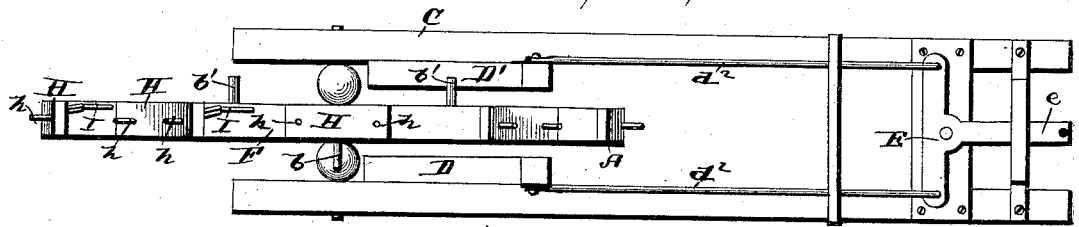
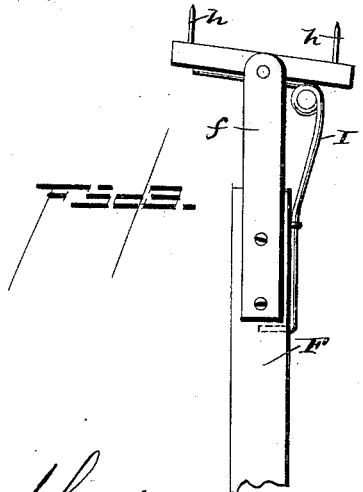
WITNESSES.
W. H. Pumphrey.
Van Buren Hillyard.
INVENTOR.
Squire B. Alley
By R. S. & A. B. Lacey
Attorneys

UNITED STATES PATENT OFFICE.

SQUIRE B. ALLEY, OF SELMA, KANSAS.

CHECK-ROW PLANTER.

SPECIFICATION forming part of Letters Patent No. 396,797, dated January 29, 1889.

Application filed August 2, 1888. Serial No. 281,714. (No model.)

*To all whom it may concern:*

Be it known that I, SQUIRE B. ALLEY, a citizen of the United States, residing at Selma, in the county of Anderson and State of Kansas, have invented certain new and useful Improvements in Check-Row Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to planters, and particularly to the means for operating the seed-slide, and has for its object the provision of a wheel for operating the seed-slide mechanism that will space off an equal distance, and which will not be likely to slip or drag along on the ground.

The improvement consists of the peculiar construction and the combination of the parts, which hereinafter will be more fully described and claimed, and shown in the annexed drawings, in which—

Figure 1 is a side view of my invention; Fig. 2, a bottom plan view, and Fig. 3 a detail view of the outer end of one of the spokes.

The attachment may be applied to the planter in any convenient manner; and as the ways and means are so multifarious I will simply confine myself to the attachment *per se.*

The walking-wheel A is located at one end of the frame C, and is journaled on the rod $a$, or the rod $a$ may be journaled at its ends in the frame and the wheel keyed to the said rod, and is provided on each side with the tappets, the tappets $b$ being on one side and the tappets $b'$ on the other side. The two elbow-levers D and D' are pivoted to the frame, one on each side of the plane of the wheel, and have their horizontal arms projected rearward within the path of the said tappets and their vertical arms connected with the T-lever E by the pitman $d^2$. The T-lever E is pivoted to the cross-bar $c$ of the frame, and is adapted to have its arm $e$ connected with the seed-slide by any suitable means.

The wheel A is composed of the spokes F, which are secured at their inner ends between the plates $f$, and are strengthened and braced by the ring G. The short bars H, pivoted to the ends of the spokes, have prongs $h$ at their ends, and are held in position by the springs I, which have one end secured to the spokes and their free ends bearing against the said bars H. The bars H are pivoted between the plates J, which are secured to the spokes.

As the holder is drawn over the ground the prongs at the ends of the bars H press into the ground and effect a rotation of the wheel, and the tappets engaging with the elbow-levers cause them to vibrate and effect a corresponding movement of the lever E. The tappets are so disposed that they alternately operate on the levers.

Having thus described my invention, what I claim, and desire to secure by Letters Patent, is—

The herein-described planter attachment, composed of the frame, the wheel having tappets on each side, the T-lever E, the elbow-levers D and D', connected with the arms of the T-lever, the cross-bars having prongs pivoted midway of their ends to the spokes of the wheel, and the springs secured at one end to the spokes and having their other ends bearing on the said cross-bars throughout their length, substantially as shown.

In testimony whereof I affix my signature in presence of two witnesses.

SQUIRE B. ALLEY.

Witnesses:
    W. A. JENNINGS,
    PHINEAS BARNES.